US011914911B1

(12) United States Patent
Matsuo

(10) Patent No.: US 11,914,911 B1
(45) Date of Patent: Feb. 27, 2024

(54) INDUSTRIAL PRINTING SYSTEM, SITE SERVER, AND PROCESSING MANAGEMENT METHOD FOR DISTRIBUTED PROCESSING OF PRODUCTION PRINTING IN PEER-TO-PEER

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/894,825

(22) Filed: Aug. 24, 2022

(51) Int. Cl.
 G06F 3/12 (2006.01)
 H04N 1/32 (2006.01)
(52) U.S. Cl.
 CPC .......... G06F 3/1264 (2013.01); G06F 3/1204 (2013.01); G06F 3/1274 (2013.01); H04N 1/32529 (2013.01); H04N 1/32545 (2013.01)
(58) Field of Classification Search
 None
 See application file for complete search history.

(56) References Cited

U.S. PATENT DOCUMENTS

2009/0279137 A1* 11/2009 Mori .................. G06F 3/1212
 358/1.15
2015/0156351 A1 6/2015 Yamamoto

* cited by examiner

Primary Examiner — Lennin R RodriguezGonzalez
(74) Attorney, Agent, or Firm — Hawaii Patent Services; Nathaniel K. Fedde; Kenton N. Fedde

(57) ABSTRACT

Provided is an industrial printing system that performs peer-to-peer distributed processing of production printing. The industrial printing system performs production printing and includes a plurality of site servers. A plurality of site servers performs distributed processing of print jobs. Each site server has a storage unit, a processing determination unit, and a processing management unit. The storage unit stores a capacity table showing the capacity that can be processed in the print process and the post-processing process. The processing determination unit determines other site servers that can process jobs from a plurality of site servers based on the capacity table stored in the storage unit. The processing management unit sets a schedule for processing jobs by other site servers determined to be processable by the processing determination unit and sends jobs to other site servers to request processing according to the schedule settings.

12 Claims, 5 Drawing Sheets

INDUSTRIAL PRINTING SYSTEM, SITE SERVER, AND PROCESSING MANAGEMENT METHOD FOR DISTRIBUTED PROCESSING OF PRODUCTION PRINTING IN PEER-TO-PEER

BACKGROUND

The present disclosure relates to an industrial printing system, a site server, and a processing management method for performing distributed processing especially for industrial printing (production printing).

In a typical print system including a plurality of printers, there is a print system that performs so-called ubiquitous printing. When this system receives a job from a PC that has issued a ubiquitous job in a print system including multiple functional peripherals (MFPs), the first MFP has memory if its print settings can be processed by its own print function. If the first MFP cannot be processed, it is transferred to the next MFP. This process is performed in the order of the first MFP to the Nth MFP defined in advance. As a result, the ubiquitous job is saved in the memory of the MFP that can be processed. As a result, in the print system, it is possible to reduce the waiting time for the user to obtain the printed matter.

That is, in this typical technology, the print data (job) is transferred to each MFP, and it is determined whether or not the transferred MFP itself can be processed.

On the other hand, in industrial printing called production printing by using a commercial (industrial) printing apparatus, the constituent members of the final product are produced by dividing the labor in a plurality of processes. For example, in the case of bookbinding, the cover, the body (color), the body (black and white), the promotional material, the band, the shipping envelope, and the like, are processed as different jobs. Then, in the middle of the process, each job is combined and finished as a final product book.

SUMMARY

An industrial printing system according to the present disclosure is an industrial printing system that performs production printing having a plurality of site servers that perform distributed processing of a job, and each of the plurality of site servers including: a storage unit that stores a capacity table showing the capacity of processing in print processing and post-processing; a processing determination unit that determines other site server capable of processing the job from the plurality of site servers based on the capacity table stored in the storage unit; and a processing management unit that performs schedule setting for processing the job by the other site server determined to be capable of processing by the processing determination unit and transmits the job to the other site server to request processing according to the schedule setting.

A site server according to the present disclosure is a site server for performing distributed processing of jobs in an industrial printing system that performs production printing, including: a storage unit that stores a capacity table showing the capacity of processing in print processing and post-processing; a processing determination unit that determines other site server that can process the job from the plurality of site servers based on the capacity table stored in the storage unit; and a processing management unit that performs schedule setting for processing the job by the other site server determined to be capable of processing by the processing determination unit and transmits the job to the other site server to request processing according to the schedule setting.

A processing management method according to the present disclosure is a processing management method executed by an industrial printing system having a plurality of site servers that perform distributed processing of jobs and performing production printing, including the steps of: storing a capacity table showing the capacity of processing in print processing and post-processing; determining other site server capable of processing the job from the plurality of site servers based on the capacity table that is stored; performing schedule setting for processing the job by the other site server determined to be capable of processing; and transmitting the job to the other site server to request processing according to the schedule setting.

DETAILED DESCRIPTION

Embodiment

[A Configuration of Industrial Printing System X]

Figure 1:
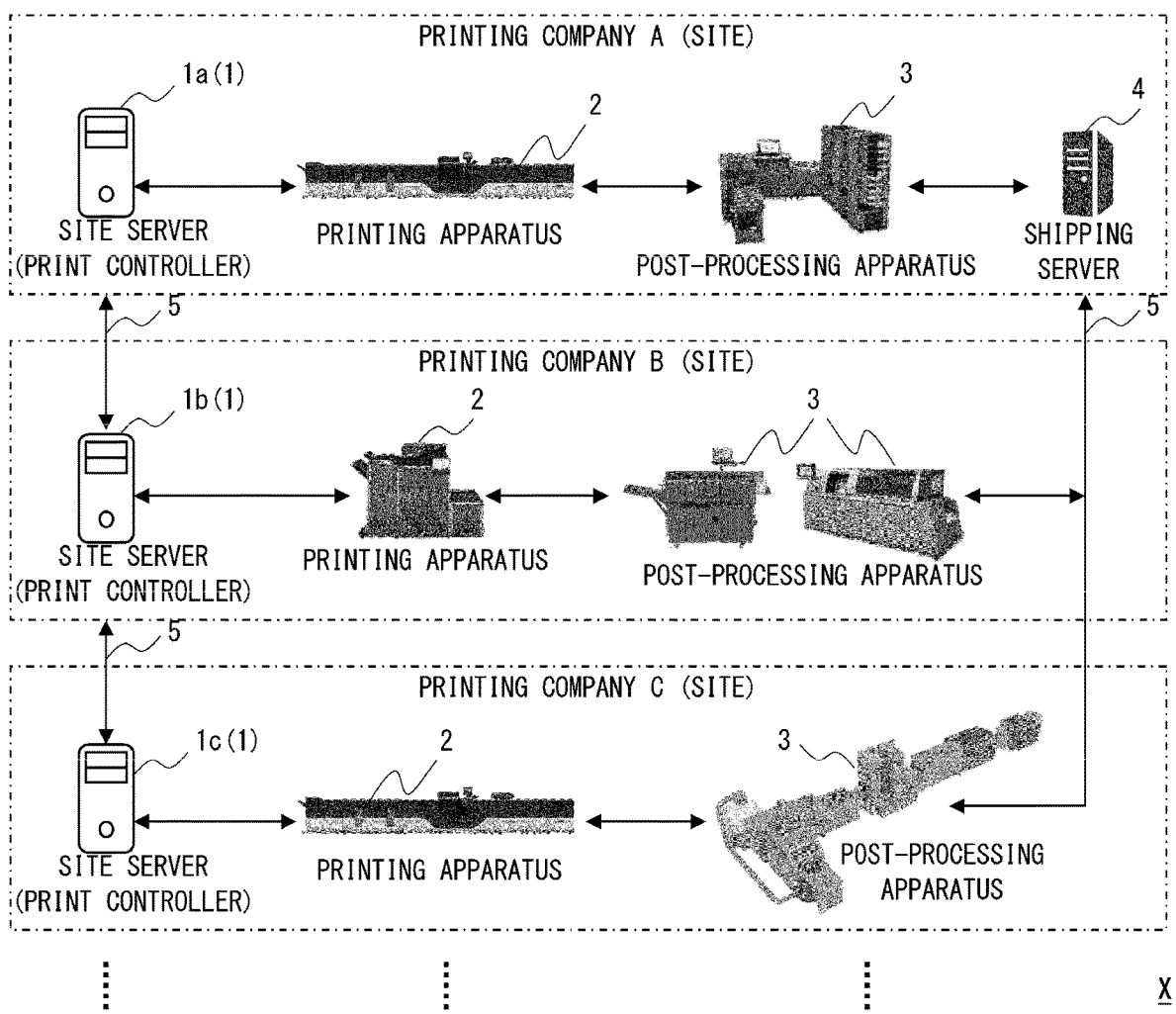
FIG. 1 is an example of a system configuration figure of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output by a printing process and a post-processing process (hereinafter, also simply referred to as "printing") in industrial printing (production printing).

Here, in the industrial printing system X of the present embodiment, a final product such as an output book is set as an "order", and each component of the order is set as a job.

In the industrial printing system X, each site such as a printing company, a printing factory, and the like, is connected by a network 5 and cooperated with each other. Each site is provided with a site server 1 and printing-related apparatuses including a printing apparatus 2, a post-processing apparatus 3, a shipping server 4, and the like (hereinafter referred to as "component apparatus(es)").

In FIG. 1, as an example of cooperation (linkage) between the sites, site servers 1a, 1b, 1c, . . . in printing companies A, B, C, . . . and the shipping server 4 of the printing company A are connected with the network 5.

Hereinafter, any one of these site servers 1a, 1b, 1c, . . . is simply referred to as "the site server 1".

The site server 1 is an information processing apparatus that serves as a print controller for managing and controlling component apparatuses including a printing apparatus 2 and a post-processing apparatus 3 provided in each site. The site server 1 is configured with a PC (Personal Computer) server, a dedicated apparatus, a general-purpose apparatus, and the like.

In the present embodiment, the site server 1 performs distributed processing of job 210 (FIG. 3) in peer-to-peer of production printing by executing dedicated print management application software (hereinafter, simply referred to as "application"). The print management application (hereinafter referred to as a dedicated application) may run a common platform that performs printing design creation, user management, tenant management, security management, maintenance notification service, prepress processing management, document storage management, printing apparatus 2 management, or the like.

Specifically, the site server 1 sends and receives various instructions and information to and from the printing apparatus 2, the post-processing apparatus 3, the shipping server 4, and the like, in production printing. Thus, the site server 1 manages the status of each apparatus and performs a processing request of the job 210.

In the present embodiment, an example that the site server 1 in the side to request for processing (hereinafter referred to "own site server") send a job to the site server 1 in the side to be requested for processing (hereinafter referred to "the other site server") and performs distributed processing is described. That is, at least any or some in the plurality of the jobs 210 is/are scheduled between the own site server and the other site server. On this basis, the own site server or the other site server that executes the processing allocates the processing of the job 210 to each component apparatus in each the site, and it causes the processing to be executed according to the schedule.

The printing apparatus 2 is an industrial printer including an image forming apparatus for printing a small lot, an automated printing apparatus for executing processing of a printing process such as offset printing for printing a large amount (a multi lot), and the like.

The printing apparatus 2 at each site according to the present embodiment may differ in the size of the recording paper, paper quality, color profile, recordable range, and the like, used in the printing process.

The post-processing apparatus 3 is various apparatuses for executing processes of the post-processing steps such as folding, collating, cutting, bookbinding, and the like, for the recording paper printed by the printing apparatus 2.

The content and range, or the like, of the processing that can be executed in the post-processing step may also be different for the post-processing apparatus 3 at each site according to the present embodiment.

The shipping server 4 is a server that manages the shipping of the orders sent from each site after the printing process or the post-processing process is completed.

In the present embodiment, an example by using the shipping server 4 at the site of the company A is described, but the shipping server 4 may be provided at the other sites as well.

The network 5 is a LAN (Local Area Network), a wireless LAN (Wi-Fi), a WAN (Wide Area Network), a mobile phone network, an industrial network, a voice phone network, other dedicated lines, and the like. The network 5 can send and receive various commands and data to and from each apparatus. Further, the site server 1 and each component apparatus may also be connected by a LAN, or the like, in the network 5. In addition, VPN (Virtual Private Network), or the like, may be configured in the network 5.

Further, the plurality of these apparatuses may exist depending on the intended use, the scale of printing, and the like. Each apparatus can be connected to the site server 1 by various protocols via the network 5, LAN, and the like. Alternatively, the site server 1 and each component apparatus may be directly connected by wire using various interfaces.

In addition, in each site, other component apparatus(es) managed by the site server 1 may be provided. The other component apparatus(es) includes, for example, a terminal for submission, a terminal for design proofreading, a prepress apparatus, and the like.

Furthermore, an administrator terminal or a general-purpose terminal (a console) used by an administrator or a user, or the like, may be connected via the network 5 from inside or outside each site. Thus, each site server 1 can be accessed by the administrator or the user on the administrator terminal, the console, or the like, by using a web browser, a terminal program, a dedicated application, or the like. Thus, each site server 1 can perform job 210 acquisition, print design, submission, prepress processing management, progress status confirmation, processing request, and the like.

[Control Configuration of Site Server 1]

Figure 2:
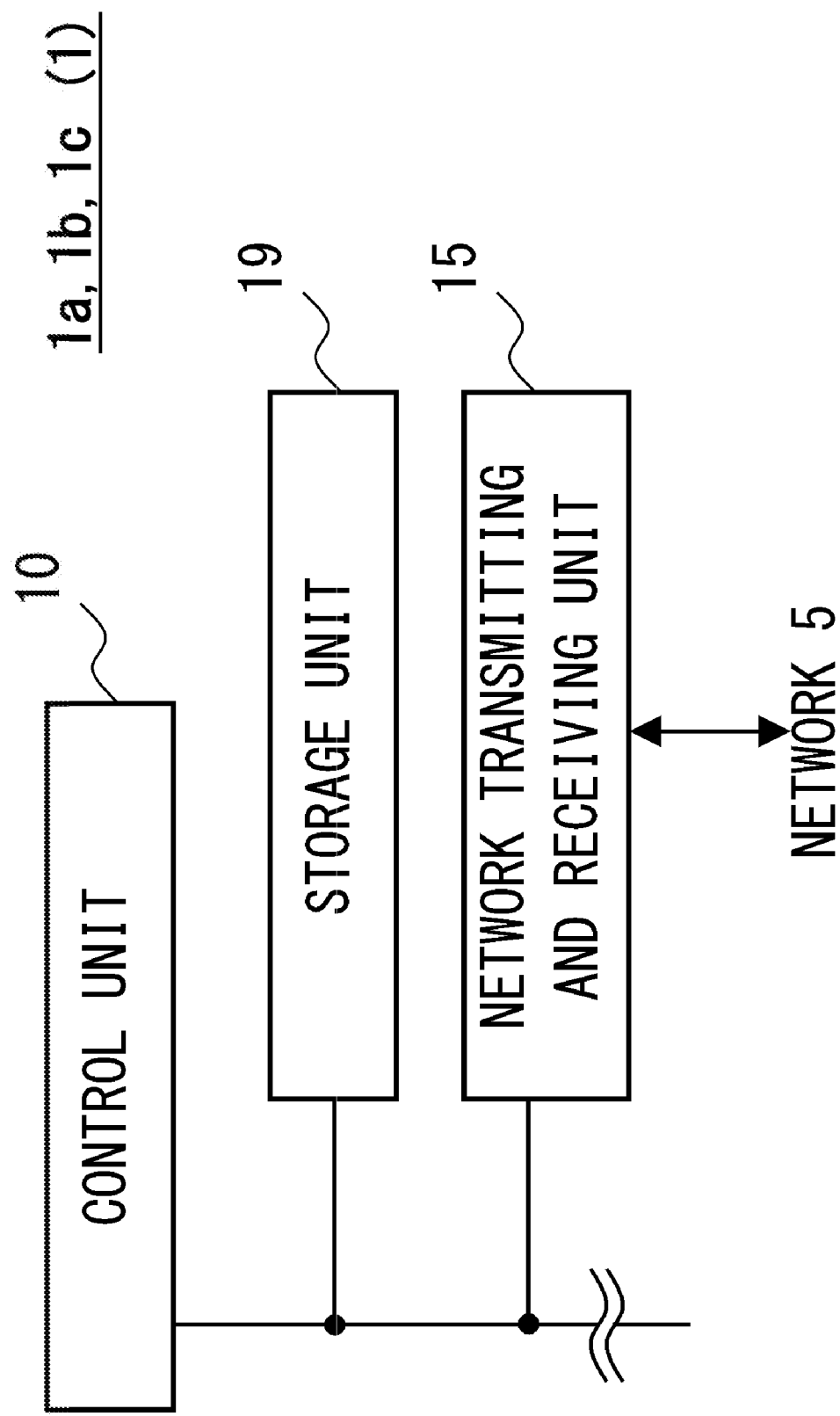
FIG. 2 is a block diagram showing a control configuration of the site server as shown in FIG. 1.

Then, with reference to FIG. 2, the control configuration of the site server 1 is described.

The site server 1 includes a control unit 10, a network transmitting and receiving unit 15, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific applications), and the like.

The control unit 10 reads a control program stored in a ROM or a HDD of the storage unit 19, expands the control program in the RAM, and executes the control program, so that the control unit 10 can be operated as each part of the functional block as described later. Further, the control unit 10 controls the entire apparatus according to the instruction information input from the administrator terminal or the console.

The network transmitting and receiving unit 15 is a network connection unit such as a LAN board, a wireless transceiver, or the like, for connecting to the network 5.

The network transmitting and receiving unit 15 transmits/receives data on a data communication line, and it transmits/receives a voice signal on a voice telephone line.

The storage unit 19 is a non-transitory recording medium of a semiconductor memory such as a ROM (Read Only Memory), a RAM (Random Access Memory), or the like, or an HDD (Hard Disk Drive), or the like.

The control program for controlling the operation of the site server 1 is stored in the ROM or HDD of the storage unit 19. The control program includes an OS (Operating System), middleware on the OS, a service (a daemon), various applications, database data, and the like. Among these, various applications include the above-mentioned dedicated application. Further, the storage unit 19 may also store account settings of users and administrators of the industrial printing system. X, other data, and the like.

In addition, the control unit 10 may be integrally formed such as a CPU having built-in GPU, a chip-on-module package, and an SOC (System On a Chip).

Further, the control unit 10 may have a built-in RAM, ROM, flash memory, or the like.

[Functional Configuration of Site Server 1]

Figure 3:
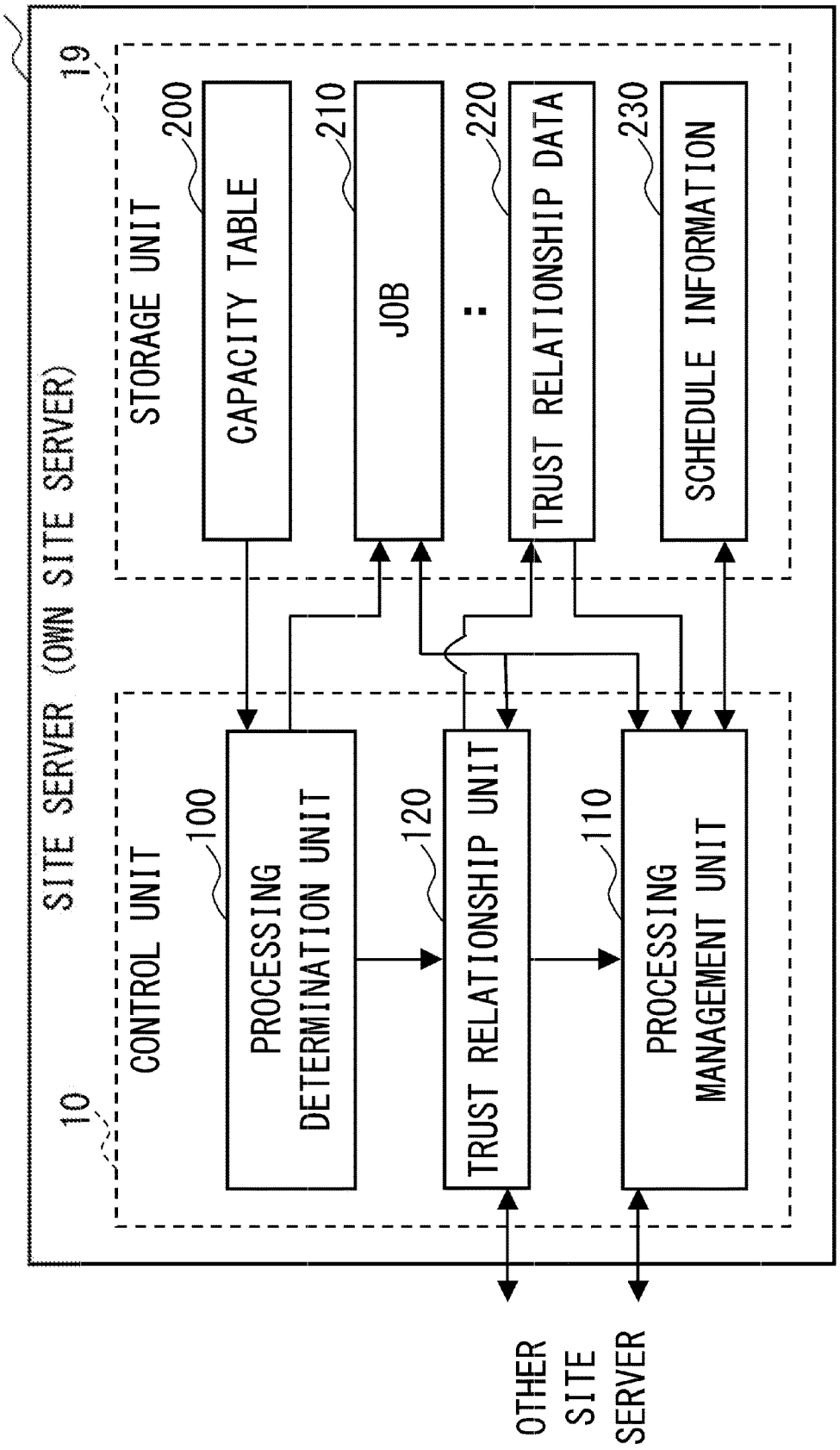
FIG. 3 is a block diagram showing a functional configuration of the site server as shown in FIG. 1.

Here, with reference to FIG. 3, the functional configuration of the site server 1 is described.

Here, as a representative example, the configuration of the site server 1a as the own base server is described, but the same applies to other base server(s).

The control unit 10 of the site server 1a includes a processing determination unit 100, a processing management unit 110, and a trust relationship unit 120.

The storage unit 19 stores the capacity table 200, the job 210, the trust relationship data 220, and the schedule information 230.

The processing determination unit 100 determines the other site server that can be processed by the job 210 among the plurality of site servers 1 based on the capacity table 200 stored in the storage unit 19.

The processing management unit 110 sets schedule information 230 for processing the job 210 by the other site server determined to be capable of processing by the processing determination unit 100. Then, the processing management unit 110 sends the job 210 to the other site server according to the schedule set in the schedule information 230 to request processing.

In this case, the processing management unit 110 requests sharing of the schedule information 230 with the other site server, shares the processing status after the schedule is confirmed, and adjusts the processing request.

At this time, the processing management unit 110 may send the job 210 to the other site server for which the trust relationship has been established by the trust relationship unit 120 to process the job 210. In this case, the processing management unit 110 may encrypt and transmit the job 210.

The processing management unit 110 shares the schedule information 230 based on the established trust relationship, and it sets whether showing only the existence of the job 210 or making the contents viewable in the job 210 according to the browsability condition set in the trust relationship data 220.

The trust relationship unit 120 establishes a trust relationship that allows restricted access with the other site server determined to be capable of processing by the processing determination unit 100, and it sets the trust relationship data 220.

At this time, the trust relationship unit 120 may set a trust relationship period for establishing the trust relationship in the trust relationship data 220 and delete the job 210 transmitted to the other site server after the trust relationship period has passed.

Further, the trust relationship unit 120 can set the browsability condition in the trust relationship data 220 as "all the jobs 210 of the site server 1", "only the jobs 210 that meet the condition", or "only the jobs 210 that is processing requested".

The capacity table 200 is a table, or the like, which shows the processing capacity in the printing process by printing apparatus 2 and the process of post-processing process by post-processing apparatus 3 among the component apparatuses provided in the site managed by the base server 1.

The capacity table 200 includes, in the printing process, information such as the processing capacity of the printing apparatus 2, color quality, printable paper, stock status of print resources, stock status of available paper, and ink remaining amount, and the like. Among these, the information on color quality includes information such as supported colors, special colors such as gold and silver, resolution, color gamut (color profile), halftone, trapping, scaling, and the presence or absence of borderless printing, and the like.

Further, the printable paper information includes information such as paper type, tray information, size, orientation, and the like.

The capacity table 200 includes, in the post-processing process, information such as the processing capacity of the post-processing apparatus, the inventory status of post-processing resources, the inventory status of consumables, and the like. Among these, the information on processing capacity includes information on capability of cutting, folding, streaking, perforation, binding, drilling, and the like.

In the present embodiment, each site server 1 stores the capacity table 200 in the storage unit 19 corresponding to each site of a plurality of site servers 1 (groups) that can be linked.

The job 210 is data that summarizes various data used at the time of printing in production printing. The job 210 may be described in, for example, JDF (Job Description Format) and/or JMF (Job Messaging Format).

In the present embodiment, the data mainly used in the printing process and the post-processing process in the job 210 are described.

Further, job 210 may include job information, job tickets, print data, print resources, and the like.

The job information is data including print processing attributes. In the job information the type of job 210, the name of the job 210, the name of the project (order), the reserved printing apparatus 2, the number of copies and the presence or absence of collating, the presence or absence of recording, the number of cutting mm, the printing direction, the printing state, the priority, and the like are set. Among these, the types of jobs 210 include job 210 in the printing process (print job) and job 210 in the post-processing process (post-processing job).

The job ticket is setting data for requesting the job 210. This request includes subordinate settings in the workflow that are order settings, such as necessary settings including imposition position and post-processing. In the present embodiment, the job ticket may be created from a workflow template for printing according to an order. Job tickets may also be described in JDF and/or JMF.

The print data is data of a printing document where design is set according to the order. The print data may be, for example, electronic document data such as PDF (Portable Document Format), PS (Postscript) data, other vector data, data in a format for submission, other raster image data, and the like.

The print resource is information on various resources required for printing instructions such as an ICC profile, or the like. The other resource data required for printing is also included in the print resource.

In addition, the job 210 may include processing change information. The processing change information is the recorded information of the change at the time of processing the job 210. The processing change information may include, for example, information such as correction contents when there is a delay in each site server 1 and changes in the processing result in printing, or the like. The correction contents include, for example, changes in the number of copies and pages, alternative profiles, correction of imposition position, correction of milling processing designation, correction of cutting width, and the like.

Further, the job 210 may include image data that has been performed raster-in-process (hereinafter, abbreviated "RIP") by offset printing based on the job ticket. This image data may be, for example, bitmap data of TIFF or the other type. In addition, the image data may be lossless compressed or lossy compressed.

The trust relationship data 220 is data on an established trust relationship for restricting access to the other management server 1. In the present embodiment, in the trust relationship data 220, an ID (Identification), a URL (Uniform Resource Locator), an IP address, or the like of the other management server for which the trust relationship has been established, a trust relationship period, which is a period for establishing a trust relationship, browsability condition, user ID, security scope, operation authority, key data, other conditions, or the like, are set. Among these, the browsability condition can be set as "all of the jobs 210 of the site server 1", "only the jobs 210 that meet the condition", "only the jobs 210 that is processing requested", and the like. As the user ID, an ID of a "trusted user" who can be accessed only by a specific processing request user is set. This "trusted user" may be, for example, a "processing request user" such as the administrator or the user of the site server 1 on the site of requesting the distributed processing for the job 210. The security scope and operation authority can be set to, for example, "direct access not possible", "view only", or "permit operation" from other sites. Among these, in the case of "view only" from another site, for example, the processing request user can confirm the job 210 setting on the processable site server 1. Alternatively, in "permit operation" from another site, the processing request user can perform the job 210 processing operation, or the like, on the site server 1 that can process. In this case as well, only the request job 210 may be accessible.

In addition, the trust relationship data 220 can specify not only the operation authority but also the "operation range" of the job 210. For this operation range, for example, "all jobs 210 of the site server 1", "only jobs 210 that meet the condition", "only requested jobs 210", and the like can be specified. Among these, as a condition for "only the job 210 that meets the condition", for example, only the job 210 requested from the site server 1*a* of the company A, or the like, can be set.

The schedule information 230 is a table, or the like, showing the status of the schedule related to the execution of each job 210. For the schedule information 230, for example, a schedule such as a vacancy, a tentative for the job 210, and a busy for the job 210 is set in each time zone of the printing process and the post-processing process. Further, about tentative or busy job 210 in the schedule, the ID, type, component apparatus to be used, status, and the like, are set as the contents of the job 210. Among them, the status of the job 210 includes the progress (delay) status of the job 210 to be processed and the previous job 210. Further, the schedule information 230 may also reflect the operating status of each component apparatus.

In the present embodiment, the schedule information 230 is shared with the other site server for which the trust relationship has been established. At this time, the browsability condition of the schedule information 230 is also set based on the trust relationship data 220. For example, the browsability condition can be set such as "the contents of the job 210 can be browsed" and "the contents of the job 210 cannot be browsed and only the existence of the job 210 can be browsed". When "only the existence of the job 210 can be browsed", the job 210 may be browsed as a "black box" on the schedule table on the site server 1 to be browsed. The browsability condition of the schedule information 230 may be set for each job ID of the job 210 and/or according to the security scope of the trusted user, the operation authority, the operation range, and the like.

Here, the control unit 10 of the site server 1 is made to function as the processing determination unit 100, the processing management unit 110, and the trust relationship unit 120 by executing the control program stored in the storage unit 19.

Further, each part of the above-mentioned site server 1 becomes a hardware resource for executing the output management method of the present disclosure.

In addition, apart or any combination of the above-mentioned functional configurations may be configured in terms of hardware or circuit by IC, programmable logic, FPGA (Field-Programmable Gate Array), or the like.

[Job Distributing Execution Process by Site Server 1]

Figure 4:
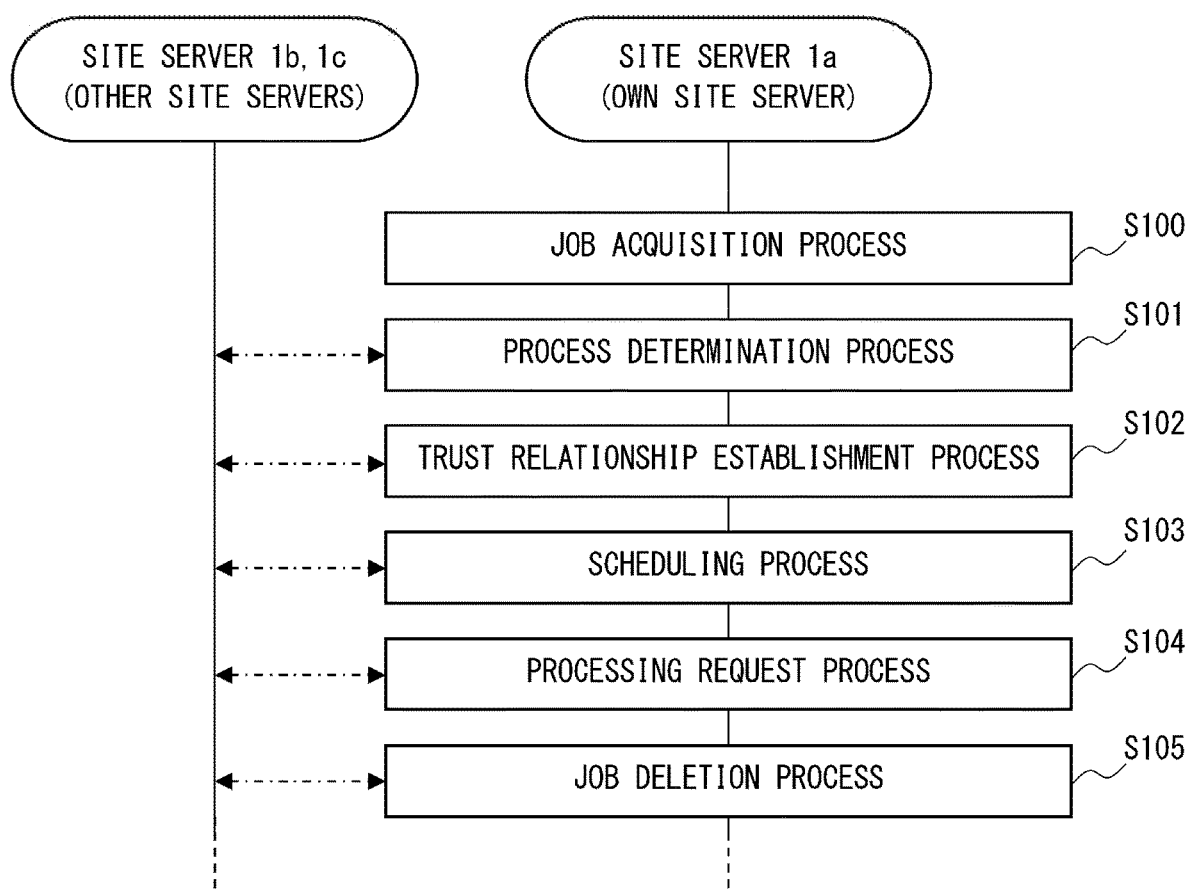
FIG. 4 is a flowchart of a job distributing execution process according to the embodiment of the present disclosure.
Figure 5:
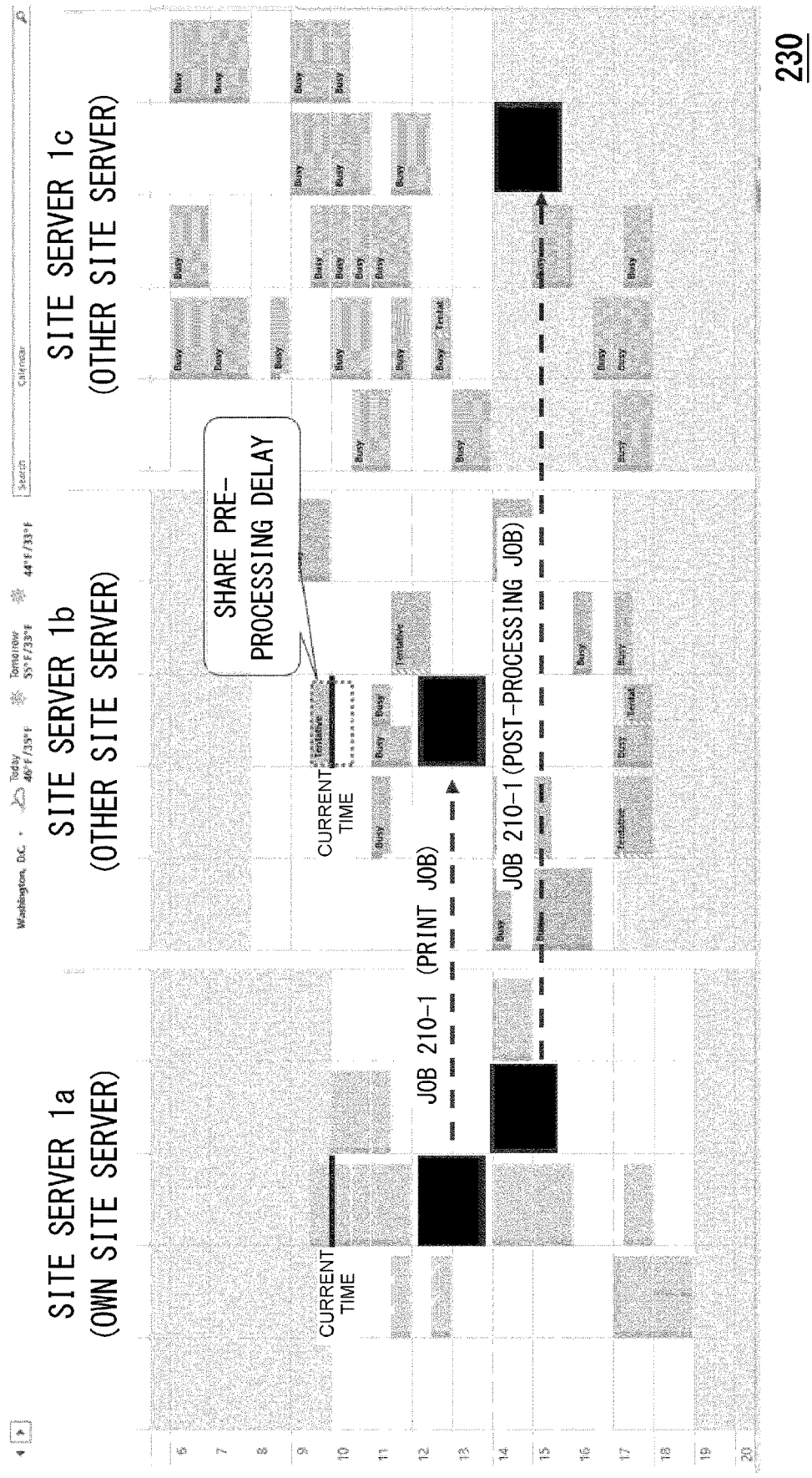
FIG. 5 is a conceptual diagram of scheduling in the job distributing execution process as shown in FIG. 4.

Next, with reference to FIGS. 4 to 5, a job distributing execution process by the site server 1 according to the embodiment of the present disclosure is described.

In the job distributing execution process of the present embodiment, the own site server determines the other site server that is capable to process the job 210 among the plurality of site servers 1 based on the capacity table 200 stored in the storage unit 19. Then, the processing schedule of the job 210 is set to the other site server determined to be capable to process. At this time, a trust relationship is established with the other site server. Then, the job 210 is transmitted to the other site server for processing according to the setting of the schedule.

In the job distributing execution process according to the present embodiment, as a typical example, the site server 1*a* of the printing company A (site) is set as the own site server (processing request side). Further, the site server 1*b* of the printing company B (site) and the site server 1*c* of the printing company C (site) are used as the other base servers, respectively.

An example in the process where control unit 10 of the site server 1*a* mainly executes the program stored in the storage unit 19 in cooperation with each part and using hardware resources is described. Further, in the following example, unless otherwise specified, each functional unit is executed by the control unit 10 in the base server 1*a*.

Hereinafter, with reference to the flowchart of FIG. 4, the details of the job distributing execution process is described step by step.

(Step S100)

Firstly, the processing determination unit 100 performs the job acquisition process.

The processing determination unit 100 acquires a job 210 to be subjected to a peer-to-peer distributed processing from the administrator terminal, the prepress apparatus, or the like.

In the present embodiment, the administrator terminal may execute a web browser or the dedicated application to edit the document submitted by the submission terminal and generate the job 210. At this time, the job 210 may be generated so as to include a job ticket that is set the print processing and post-processing settings of each page by the GUI (Graphical User Interface) of the screen of the dedicated application.

Also, in the present embodiment, in each job 210, any one or combination of a plurality of apparatuses may be selected and made available in the printing process and the post-processing process.

In the example of this embodiment, the site server 1*a* that has acquired this job 210 becomes the own site server (site server 1 on the processing request side).

(Step S101)

Then, the processing determination unit 100 performs the process determination process.

The processing determination unit 100 reads out the capacity table 200 of each site server 1 stored in the storage unit 19. At this time, if the processing determination unit 100 has not acquired the capacity table 200 of the site server 1 in each site, the processing determination unit 100 acquires the capacity table 200 of the site server 1 in each site where can be cooperated with from this site server 1, and then, it may be stored in the storage unit 19.

The processing determination unit 100 determines processing requirements that are requirements for processing in the printing process and the post-processing process from the job information, the job ticket, the print data, the print resources, and the like, included in the job 210. Then, the processing determination unit 100 determines whether the job 210 can be processed at the site from the capacity table 200 and the processing requirements. Specifically, in the job 210 of the print job, the processing determination unit 100 searches that the capacity table 200 shows the printing apparatus 2 capable to be processed in the printing process. On the other hand, in the job 210 of the post-processing job, the processing determination unit 100 searches that the capacity table 200 shows the post-processing apparatus 3 capable to be processed in the post-processing process. If either of the apparatuses is included, the processing determination unit 100 determines that the site server 1 of searched capacity table 200 is the other site server that the job 210 can be processed.

The processing determination unit 100 may determine that a plurality of other site servers 1 can be processed.

(Step S102)

Then, the trust relationship unit 120 performs the trust relationship establishment process.

The trust relationship unit 120 establishes a trust relationship that enables restricted access with the other site server determined capable to be processed by the processing determination unit 100, and it sets the trust relationship data 220. That is, a trust relationship is established between the site server 1 on the processing request side (the own site server) and the site server 1 on the processable side (the other site server). At this time, the trust relationship unit 120 performs a request and authentication process between the own site server and the other site server, and it establishes the trust relationship.

At that time, the trust relationship unit 120 can specify the security scope and the authority. The trust relationship unit 120 sets the browsability condition in the trust relationship data 220 to be either "all jobs 210 of the site server 1", "only jobs 210 that meet the condition", or "only jobs 210 that is processing requested". Further, the trust relationship unit 120 sets the browsability condition and operation range of the schedule information 230, such as "indicating only the existence of the job 210", "making the contents viewable", or the like.

Further, the trust relationship unit 120 sets the trust relationship period for establishing the trust relationship in the trust relationship data 220. Specifically, a trust relationship is established in a specific period including the period before and after the processing. The specific period of the trust relationship period can be adjusted later so that it can be acquired before and after the specifiable schedule as described later.

(Step S103)

Next, the processing management unit 110 performs scheduling process.

The processing management unit 110 sets a schedule for distributed processing with the other site server for which a trust relationship has been established.

The processing management unit 110 requests sharing of the schedule information 230 with the other site server. At this time, the processing management unit 110 shares the schedule information 230 based on the trust relationship data 220.

Further, the processing management unit 110 is set to "indicating only the existence of the job 210" or "making the content viewable", or the like, according to the set browsability condition.

FIG. 5 shows an example in which the schedule is shared in this way.

In this example, the site server 1a (own site server) requests the site servers 1b and 1c (other site servers) to share the schedule information 230. The site servers 1b and 1c transmit the schedule information 230 to the site server 1a.

On this basis, the processing management unit 110 sets a processing schedule for the printing process and the post-processing process.

Specifically, the processing management unit 110 specifies a processing schedule from among a plurality of processable schedules in the other site server based on the acquired schedule information 230, and it sends the processing request to the other site server.

If the process of the processing request can be executed by the other site server, the processing request is approved, and the schedule is confirmed.

As a result, both the own site server on the processing request side and the other site server on the processing capable side set the processing schedule of the job 210 in the schedule information 230.

In the example of FIG. 5, the processing of job 210-1, which is a print job of the site server 1a (the own site server), is scheduled to the site server 1b (the other site server). Further, the processing of the job 210-2, which is the post-processing job of the site server 1a (the own site server), is scheduled to the site server 1c (the other site server).

On this basis, the processing management unit 110 shares the processing status after the schedule is fixed.

The other site server shares the processing status of the printing process and the post-processing process between the own site server and the other site server.

This makes it possible to share the progress (delay) status of the process before the set process schedule.

(Step S104)

Next, the processing management unit 110 performs the processing request process.

The processing management unit 110 sends the job 210 to the other site server for which a trust relationship has been established according to the processing schedule set in the schedule information 230 and requests processing. At this time, the processing management unit 110 can encrypt the job 210 and send it to the other site server. Further, the processing management unit 110 may transmit the key data that can be decrypted only during the trust relationship period to the other site server. As a result, the processing management unit 110 can distribute the job 210 and make it process at the other site.

Here, the processing management unit 110 in the own site server can adjust the processing request based on the status of the schedule information 230.

In the example of FIG. 5, on the site server 1b, the processing before the processing (pre-processing) of the job 210-1 set in the schedule information 230 is delayed. The processing management unit 110 may delay or cancel the processing of job 210-1 based on this status and make it execute on the own site server or the site server 1c.

When the other site server receives the job 210, in the case of a print job, it instructs the selected printing apparatus 2 to print the job 210 based on the schedule information 230. As a result, the printing apparatus 2 can output for printing based on the job 210.

On the other hand, when the job 210 is a post-processing job, the other site server causes the post-processing apparatus 3 to perform the post-processing. As a result, the post-processing apparatus 3 can also perform post-processing based on the job 210.

Here, the processing management unit 110 can also record the processing result of the job 210 in the processing change information in the job 210.

(Step S105)

Then, the trust relationship unit 120 performs the job deletion process.

The trust relationship unit 120 causes the job 210 transmitted to the other site server to be deleted after the processing of the job 210 is completed or after the trust relationship period set in the trust relationship data 220. At this time, the job 210 stored in the storage unit 19 in the other site server may be deleted as in the encrypted state. Alternatively, the trust relationship unit 120 may cause the other site server to delete the key data.

As described above, the job distributing execution process according to the embodiment of the present disclosure is completed.

As configured in this way, the following effects can be obtained.

In a typical production printing, a plurality of printing apparatuses 2 may perform a distributed printing process in order to process a large amount of printing in a short time. In such distributed processing, a dedicated management server that transmits and manages print data to the plurality of printing apparatuses 2 is required.

In other words, with typical technology, it has been necessary to configure a system for distributed processing centered on the dedicated management server.

On the other hand, the industrial printing system X according to the present embodiment is an industrial printing system that performs production printing having a plurality of site servers 1 that perform distributed processing of a job 210, and each of the plurality of site servers 1 including: a storage unit 19 that stores a capacity table 200 showing the capacity of processing in print processing and post-processing; a processing determination unit 100 that determines other site server capable of processing the job 210 from the plurality of site servers 1 based on the capacity table 200 stored in the storage unit 19; and a processing management unit 110 that performs schedule setting to schedule information 230 for processing the job 210 by the other site server determined to be capable of processing by the processing determination unit 100 and transmits the job 210 to the other site server to request processing according to the schedule setting set in the schedule information 230.

With this configuration, it is possible to provide a peer-to-peer industrial printing system that does not require a management server for distributed processing and can flexibly perform distributed processing between site servers 1. That is, in the industrial printing system X according to the present embodiment, it is not necessary to separately prepare a dedicated management server for distributed processing.

Further, in typical production printing, distributed processing by printing apparatuses at sites of different companies, or the like, has not been considered so much.

Here, in a typical digital printing, the processing of a wide variety of small lot jobs is required due to the demand for diversification of the market. In order to meet these various printing demands, especially small and medium-sized printing companies are responding by collaborating while adjusting manually.

When automating such collaboration between printing companies, in a system construction with a typical management server, the company that installs one typical management server is advantageous, and troubles related to the company may occur. Thus, it couldn't be realized.

On the other hand, the industrial printing system X according to the present embodiment does not require the dedicated management server, and the printing companies cooperate with each other between the site servers 1 for each site. With this, it is possible to easily construct a system for distributed processing of jobs 210 on a peer-to-peer basis. Therefore, it is possible to cooperate on an equal footing, and it is possible to prevent the occurrence of troubles in the relationship in collaboration between printing companies, and the like.

Further, the industrial printing system X according to the present embodiment can be configured as each site server 1 simply by storing the capacity table 200 in an existing print controller and installing a dedicated application or the like. Then, the site servers 1 can be linked with each other on a peer-to-peer basis. Therefore, it is possible to easily enable production printing in which the sites of existing companies, and the like, are cooperated with each other.

Further, in the industrial printing system. X according to the present embodiment, each of the plurality of site servers 1 further including a trust relationship unit 120 that establishes a trust relationship that allows restricted access with the other site server and sets this trust relationship in the trust relationship data 220; and the processing management unit 110 transmits and processes the job 210 to the other site server for which the trust relationship is established by the trust relationship unit 120.

With this configuration, a distributed system with enhanced security not only in distributed processing within a single site such as in a printing factory but also in collaboration between printing companies can be provided.

Further, in the industrial printing system. X according to the present embodiment, the processing management unit 110 requests sharing of schedule information 230 with the other site server, and after the schedule is confirmed, shares processing status and adjusts for processing request.

With this configuration, performing processing request based on the schedule and further adjusting the processing request due to delay, or the like, becomes possible. As a result, the labor of manual adjustment can be reduced and the efficiency of the processing of the job 210 can be improved, and the running cost can be reduced.

Further, in the industrial printing system X according to the present embodiment, the trust relationship unit 120 sets browsability condition in the trust relationship data 220 as all jobs 210 of the site server 1, only job (s) 210 that meets a condition, or only the job 210 that is processing requested; and the processing management unit 110 shares the schedule based on the established trust relationship set in the trust relationship data 220 and sets whether showing only existence of the job 210 or making content viewable in the job 210 according to the browsability condition that is set.

With such a configuration, a situation in which a job 210 of another client, or the like, is browsed when the schedule is shared in collaboration with a company, or the like, can be prevented. Therefore, security can be improved, and collaboration between companies, and the like, can be facilitated.

Further, in the industrial printing system X according to the present embodiment, the trust relationship unit 120 sets a trust relationship period for establishing the trust relationship in the trust relationship data 220, and it deletes the job 210 sent to the other site server after the trust relationship period set in the trust relationship data 220 has passed.

With this configuration, the transmitted job 210 is remained on the other site server and causes a risk of leakage, or the like, can be prevented. Therefore, security and facilitate collaboration between companies, and the like, can be improved.

Other Embodiments

In the above-described embodiment, an example is described in which the capacity table 200 of a plurality of site servers 1 is stored in the own site server or acquired from the other site server.

However, it is also possible to be a configuration that determine whether the job 210 can be processed by the own site server by a processing requirement of the job 210 and send the processing requirement of the job 210 to the other site server. In this case, the other site server may determine whether processing is possible from the processing requirements of the job 210 and the capacity table 200 stored in its storage unit 19.

With this configuration, the own site server can determine whether the job 210 can be processed without acquiring the capacity table 200 of the other site server. Therefore, the trouble of updating the capacity table 200 for each site, or the like, can be saved.

Further, in the above-described embodiment, an example of determining the other site server from all the site servers 1 without distinguishing whether the job 210 is a print job or a post-processing job has been described.

However, the site servers 1 (group) to be determined may be separated in the printing process and the post-processing process.

Further, both the job 210 of the print job and the other job 210 of the post-processing job may be distributed to the same other site server.

In addition, a priority may be given as to which site server 1 becomes as the other site server. This priority may be set based on the availability of schedule information 230, the number and performance of component apparatuses, costs, and other information.

With such a configuration, the job 210 can be distributed to each site more efficiently.

Further, in the above-described embodiment, an example in which the job 210 transmitted to the other site server is deleted after the processing is described.

However, the processed job 210 may be re-transmitted to the own site server again. Further, after the printing process is completed, the job 210 may be directly transmitted to the site server 1 different from the one processed so that the processing of the post-processing process is performed.

With such a configuration, the processing of the job 210 can be made more efficient.

Further, in the above-described embodiment, an example in which the job 210 is directly requested to be processed by the other site server is described.

However, the job 210 itself can be changed according to the processing result of the job 210, the change of the schedule, and the like.

In this case, for example, the number of pages, the color profile to be used, or the like, can be changed as the job 210 that can be processed when adjusting the processing request due to the delay.

Alternatively, the job 210 itself can be divided and the divided job 210 can be sent to the own site server or to the site server 1 that is different from the other site server, which has been requested.

With this configuration, even if a trouble, or the like, occurs, the job 210 can be executed by distributed processing.

Further, as described above, when the processing request is adjusted, the change information may be recorded in the job 210 itself, and the changed job 210 may be acquired by the own site server. Further, it is also possible to include the image data RIP-ed by the other site server in this job 210.

As a result, even if resending to the base server 1 that is different from the requested one, the same output, or the like, can be performed.

Further, it is needless to say that the configuration and operation of the above-described embodiment are examples and can be appropriately modified and executed without departing from the aim of the present disclosure.

What is claimed is:

1. An industrial printing system that performs production printing having a plurality of site servers that perform distributed processing of a job, and each of the plurality of site servers comprising:
    a storage unit configured to store a capacity table showing a capacity of processing in print processing and post-processing;
    a processing determination unit configured to determine another site server capable of processing the job from the plurality of site servers based on the capacity table stored in the storage unit; and
    a processing management unit configured to perform schedule setting for processing the job by the other site server determined to be capable of processing by the processing determination unit and transmit the job to the other site server to request processing according to the schedule setting, wherein
    each of the plurality of site servers further comprises: a trust relationship unit configured to establish a trust relationship that allows restricted access with the other site server; and
    the processing management unit transmits and processes the job to the other site server for which the trust relationship is established by the trust relationship unit.

2. The industrial printing system according to claim 1, wherein
    the processing management unit requests sharing of schedule with the other site server, and after the schedule is confirmed, shares processing status and adjusts the processing request.

3. The industrial printing system according to claim 2, wherein
    the trust relationship unit sets browsability condition as all jobs of the site server, only jobs that meets a condition, or only the job that is processing requested as the trust relationship; and
    the processing management unit shares the schedule based on the established trust relationship and sets whether showing only existence of the job or making content viewable in the job according to the browsability condition that is set.

4. The industrial printing system according to claim 1, wherein the trust relationship unit sets a trust relationship period for establishing the trust relationship, and deletes the job sent to the other site server after the trust relationship period has passed.

5. A site server for performing distributed processing of jobs in an industrial printing system that performs production printing, comprising:

a storage unit configured to store a capacity table showing a capacity of processing in print processing and post-processing;

a processing determination unit configured to determine another site server that can process the job from a plurality of site servers based on the capacity table stored in the storage unit; and a processing management unit configured to perform schedule setting for processing the job by the other site server determined to be capable of processing by the processing determination unit and transmit the job to the other site server to request processing according to the schedule setting, wherein the site server further comprises: a trust relationship unit configured to establish a trust relationship that allows restricted access with the other site server; and the processing management unit transmits and processes the job to the other site server for which the trust relationship is established by the trust relationship unit.

6. The site server according to claim 5, wherein the processing management unit requests sharing of schedule with the other site server, and after the schedule is confirmed, shares processing status and adjusts for processing request.

7. The site server according to claim 6, wherein the trust relationship unit sets browsability condition as all jobs of the site server, only jobs that meets a condition, or only the job that is performed processing requested as the trust relationship; and the processing management unit shares the schedule based on the established trust relationship and sets whether showing only existence of the job or making content viewable in the job according to the browsability condition that is set.

8. The site server according to claim 5, wherein the trust relationship unit sets a trust relationship period for establishing the trust relationship, and deletes the job sent to the other site server after the trust relationship period has passed.

9. A processing management method executed by an industrial printing system having a plurality of site servers that perform distributed processing of jobs and performing production printing, comprising the steps of:

storing a capacity table showing a capacity of processing in print processing and post-processing;

determining another site server capable of processing the job from the plurality of site servers based on the capacity table that is stored;

performing schedule setting for processing the job by the other site server determined to be capable of processing; and transmitting the job to the other site server to request processing according to the schedule setting, wherein the method further comprises establishing a trust relationship that allows restricted access with the other site server; and the step of transmitting the job to the other site server comprises transmitting and processing the job to the other site server for which the trust relationship is established.

10. The processing management method according to claim 9, further comprising:

requesting sharing of schedule with the other site server, and sharing processing status and adjusting for processing request after the schedule is confirmed.

11. The processing management method according to claim 10, wherein the step of establishing a trust relationship comprises setting browsability condition as all jobs of the site server, only jobs that meets a condition, or only the job that is processing requested as the trust relationship; and the step of sharing processing status comprises sharing the schedule based on the established trust relationship; and the method further comprises setting whether showing only existence of the job or making content viewable in the job according to the browsability condition that is set.

12. The processing management method according to claim 9, wherein the method further comprises:

setting a trust relationship period for establishing the trust relationship; and deleting the job sent to the other site server after the trust relationship period has passed.

* * * * *